(12) United States Patent
Akieda et al.

(10) Patent No.: US 10,007,373 B2
(45) Date of Patent: Jun. 26, 2018

(54) OPERATION PANEL WHOSE THICKNESS IS ADJUSTABLE WITH SCREW OPERABLY INSERTED INTO HOLE FORMED IN CLIP THAT CLIPS MULTIPLE BOARDS AND LOAD SENSOR SANDWICHED THEREBETWEEN

(71) Applicant: FUJITSU COMPONENT LIMITED, Tokyo (JP)

(72) Inventors: Shinichiro Akieda, Tokyo (JP); Takeshi Okuyama, Tokyo (JP); Akio Nakamura, Tokyo (JP); Koji Iizuka, Tokyo (JP); Mitsuhiro Sekizawa, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days. days.

(21) Appl. No.: 14/522,697

(22) Filed: Oct. 24, 2014

(65) Prior Publication Data

US 2015/0138111 A1 May 21, 2015

(30) Foreign Application Priority Data

Nov. 19, 2013 (JP) ................... 2013-239140

(51) Int. Cl.
*G06F 3/041* (2006.01)
*G06F 3/01* (2006.01)

(52) U.S. Cl.
CPC ............ *G06F 3/0414* (2013.01); *G06F 3/016* (2013.01); *G06F 3/041* (2013.01); *G06F 2203/04105* (2013.01)

(58) Field of Classification Search
None
See application file for complete search history.

(56) References Cited

U.S. PATENT DOCUMENTS

| 4,511,760 | A | * | 4/1985 | Garwin et al. ............. 178/18.03 |
| 5,015,802 | A | * | 5/1991 | Chi ........................... G06F 1/18 |
| | | | | 174/354 |
| 6,111,746 | A | * | 8/2000 | Wahl ...................... G06F 1/182 |
| | | | | 174/354 |
| 2004/0125086 | A1 | * | 7/2004 | Hagermoser et al. ........ 345/173 |
| 2004/0189889 | A1 | | 9/2004 | Nitto et al. |
| 2005/0016824 | A1 | * | 1/2005 | Olcott ................... G06F 3/0414 |
| | | | | 200/329 |
| 2005/0018172 | A1 | * | 1/2005 | Gelfond ................ G06F 3/0489 |
| | | | | 356/51 |
| 2005/0052425 | A1 | * | 3/2005 | Zadesky et al. ............. 345/173 |
| 2006/0250377 | A1 | * | 11/2006 | Zadesky et al. ............. 345/173 |
| 2008/0088582 | A1 | * | 4/2008 | Prest et al. .................... 345/156 |
| 2008/0088600 | A1 | * | 4/2008 | Prest et al. .................... 345/173 |

(Continued)

FOREIGN PATENT DOCUMENTS

| EP | 0126345 | 11/1984 |
| JP | 2004-302117 | 10/2004 |

(Continued)

*Primary Examiner* — David D Davis
(74) *Attorney, Agent, or Firm* — IPUSA, PLLC

(57) ABSTRACT

An operation panel includes a first board, a second board, a load sensor provided between the first board and the second board, and a clip that holds together the first board and the second board. The load sensor detects the magnitude of a force applied to the first board.

9 Claims, 16 Drawing Sheets

(56) References Cited

U.S. PATENT DOCUMENTS

| | | | |
|---|---|---|---|
| 2010/0110016 A1* | 5/2010 | Ladouceur et al. | 345/173 |
| 2010/0156818 A1* | 6/2010 | Burrough et al. | 345/173 |
| 2010/0231543 A1 | 9/2010 | Momose | |
| 2011/0057899 A1* | 3/2011 | Sleeman et al. | 345/174 |
| 2011/0141052 A1* | 6/2011 | Bernstein et al. | 345/174 |
| 2012/0126962 A1 | 5/2012 | Ujii et al. | |
| 2012/0188194 A1* | 7/2012 | Sulem | G06F 3/041 345/174 |
| 2013/0038551 A1 | 2/2013 | Shirai et al. | |
| 2013/0201127 A1 | 8/2013 | Abe et al. | |
| 2014/0218324 A1* | 8/2014 | Tissot | 345/173 |

FOREIGN PATENT DOCUMENTS

| | | |
|---|---|---|
| JP | 2006-227131 | 8/2006 |
| JP | 2010-218066 | 9/2010 |
| JP | 2013-037497 | 2/2013 |
| JP | 2013-045173 | 3/2013 |
| JP | 2013-054725 | 3/2013 |

\* cited by examiner

OPERATION PANEL WHOSE THICKNESS IS ADJUSTABLE WITH SCREW OPERABLY INSERTED INTO HOLE FORMED IN CLIP THAT CLIPS MULTIPLE BOARDS AND LOAD SENSOR SANDWICHED THEREBETWEEN

CROSS-REFERENCE TO RELATED APPLICATION

The present application is based upon and claims the benefit of priority of Japanese Patent Application No. 2013-239140, filed on Nov. 19, 2013, the entire contents of which are incorporated herein by reference.

BACKGROUND OF THE INVENTION

1. Field of the Invention

The present invention relates to operation panels and operation apparatuses.

2. Description of the Related Art

As operation apparatuses, there are switches that are pressed with a finger or the like for operation. Furthermore, as operation panels, there are touchscreen panels to which information is input by pressing a display screen with a finger or the like. In general, touchscreen panels display images, and information is input by touching the displayed images.

Reference may be made to, for example, Japanese Laid-Open Patent Application Nos. 2010-218066, 2013-45173, and 2013-54725 for related art.

SUMMARY OF THE INVENTION

According to an aspect of the present invention, an operation panel includes a first board, a second board, a load sensor provided between the first board and the second board, and a clip that holds together the first board and the second board. The load sensor detects the magnitude of a force applied to the first board.

According to an aspect of the present invention, an operation apparatus includes a first board, a second board, a load sensor provided between the first board and the second board, and a clip that holds together the first board and the second board. The load sensor detects the magnitude of a force applied to the first board.

DESCRIPTION OF THE EMBODIMENTS

Figure 1:
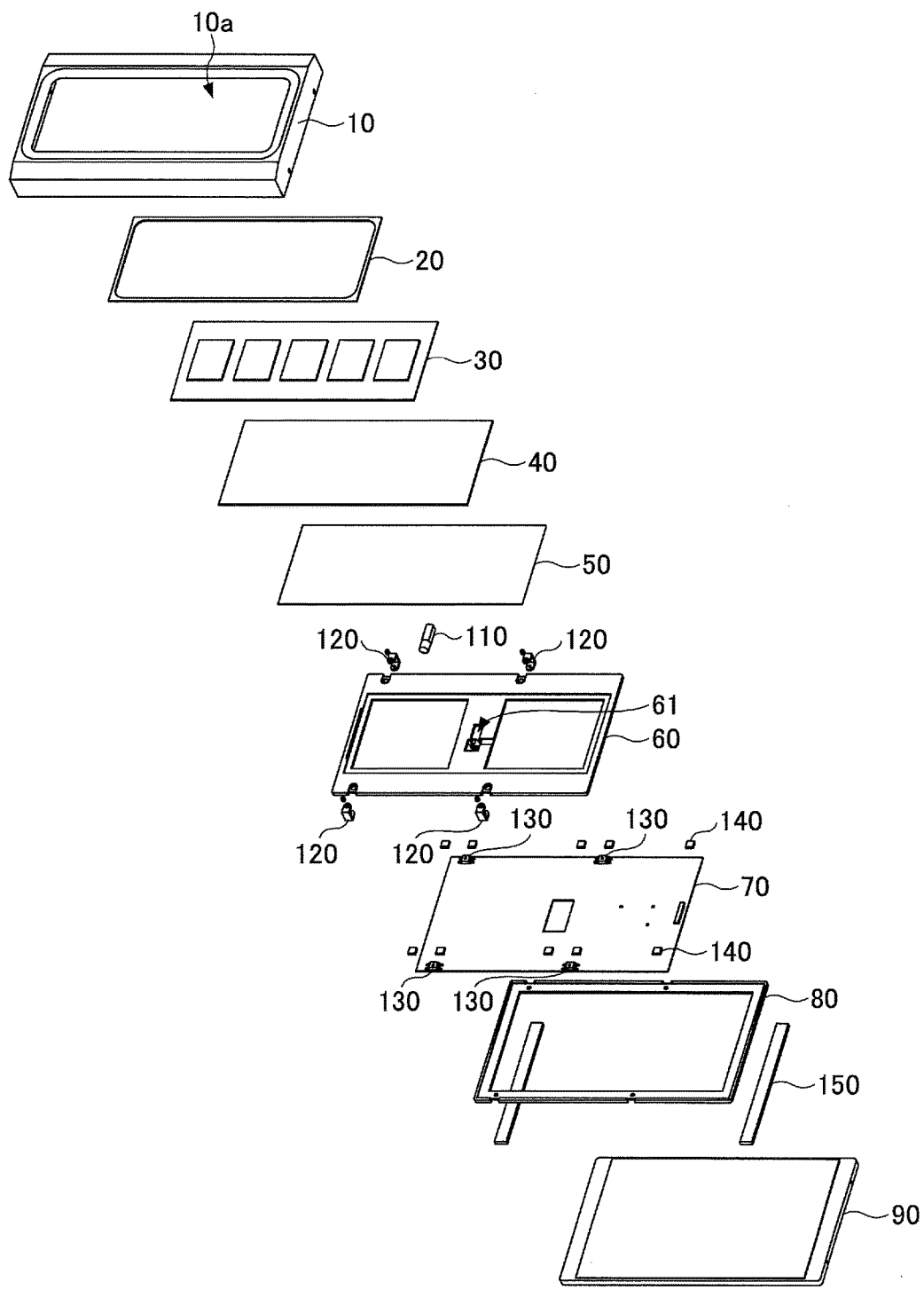
FIG. 1 is an exploded perspective view of an operation panel according to an embodiment.

In the above-described operation panels, a tactile switch is provided in an operated part. At the time of operation, the operated part is depressed by pressing the tactile switch. Therefore, the thickness of this depression has to be taken into account in determining the thickness of the operation panels, thus increasing the thickness of the operation panels. Furthermore, some tactile switches are capable of performing multiple operations in accordance with the strength of a force to press the tactile switches, and are thus capable of accommodating multilevel inputs. In the case of such tactile switches, however, it is necessary to ensure a stroke because the tactile switches have to be depressed in two stages, thus further increasing the thickness of the operation panels.

Furthermore, compared with operation panels with a tactile switch that is depressed by pressing, operation panels that are operable without being depressed generally have a high-grade image and have more added value.

An embodiment of the present invention is described below. The same members are referred to by the same reference numeral, and are not repetitively described.

An operation panel of this embodiment includes a display screen, and information may be input through the operation panel by touching the display screen.

An operation panel of this embodiment is described with reference to FIG. 1. FIG. 1 is an exploded perspective view of an operation panel according to this embodiment. Referring to FIG. 1, the operation panel includes a housing 10, a dust-proof seal 20, a display panel 30, a light guide panel unit 40, a first circuit board 50, a first board 60, a second circuit board 70, a second board 80, and a chassis 90. The operation panel further includes an eccentric rotating mass (ERM) 110, clips 120, load sensors 130, cushions 140, and suspensions 150.

The housing 10 is part of the enclosure of the operation panel. The housing 10 is formed of acrylonitrile butadiene styrene (ABS). A surface of the housing 10 is coated. An opening 10a is formed at the center of the housing 10. Information displayed on the below-described display panel 30 is viewed through the opening 10a. The dust-proof seal 20 is formed of a resin material such as urethane foam.

The display panel 30 is for displaying a region to be operated, and may be any device capable of displaying a region to be operated, such as a liquid crystal panel. The light guide panel unit 40 is provided to increase the visibility of information displayed on the display panel 30 by supplying light from the backside of the display panel 30.

An electrostatic switch and wirings for controlling the rotation of the ERM 110 are formed on the first circuit board 50. The first board 60 is formed of a material such as polybutylene terephthalate (PBT) or polycarbonate (PC). The first board 60 includes an ERM placement region 61 for placing the ERM 110.

The ERM is an example of a vibration generating element. Other vibration generating elements such as a linear vibrator and a piezoelectric element may be used in place of the ERM 110. Like the ERM 110, these vibration generating elements also are capable of generating vibrations. The load sensors 130 are provided at four points on the second circuit board 70.

The second board 80 is formed of a material such as PBT or PC.

The chassis 90 is part of the enclosure of the operation panel. The chassis 90 is formed of a material such as ABS.

A method of manufacturing an operation panel according to this embodiment is described with reference to FIGS. 2A, 2B, 2C, 2D, 2E, 2F, 2G, 2H, 2I, 2J, 2K, 2L, 2M, 2N, 2O, 2P, 2Q, 2R, 2S, 2T, 2U, 2V, 2W, 2X and 2Y.

Figure 2A:
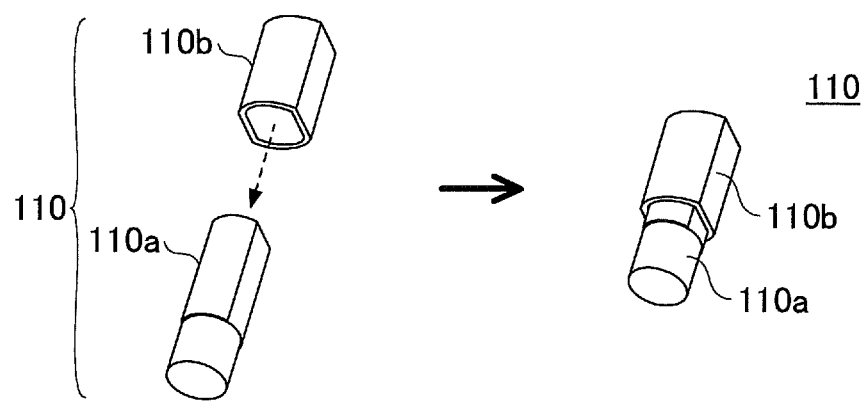
FIGS. 2A, 2B, 2C, 2D, 2E, 2F, 2G, 2H, 2I, 2J, 2K, 2L, 2M, 2N, 2O, 2P, 2Q, 2R, 2S, 2T, 2U, 2V, 2W, 2X and 2Y are diagrams illustrating a method of manufacturing an operation panel according to the embodiment.

First, as illustrated in FIG. 2A, the ERM 110 is fabricated by attaching an ERM cushion 110b to a rotary part of an ERM body 110a. The ERM cushion 110b is formed of a material such as urethane rubber.

Figure 2B:
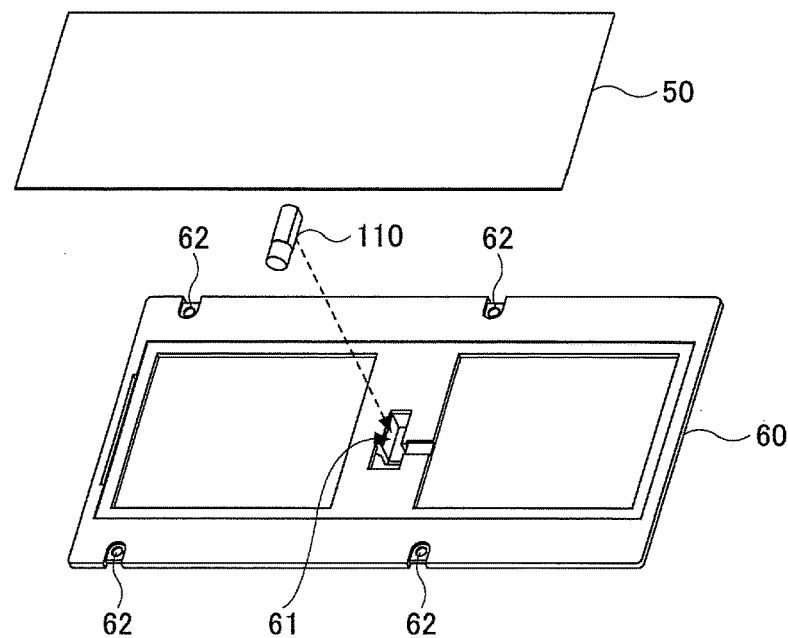
Figure 2C:
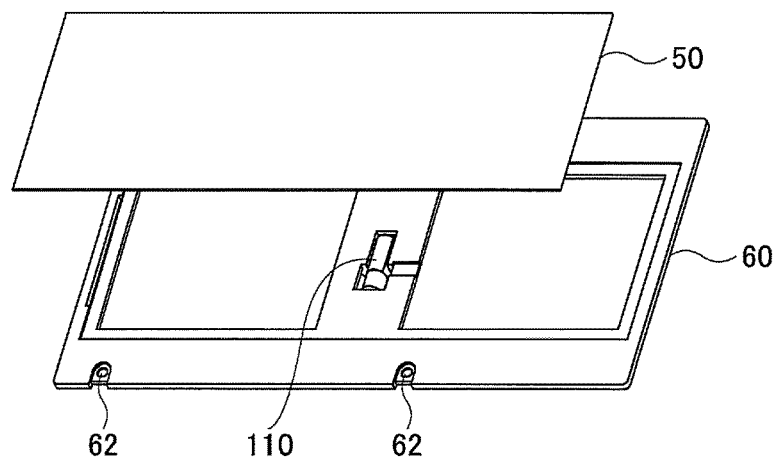
Figure 2D:
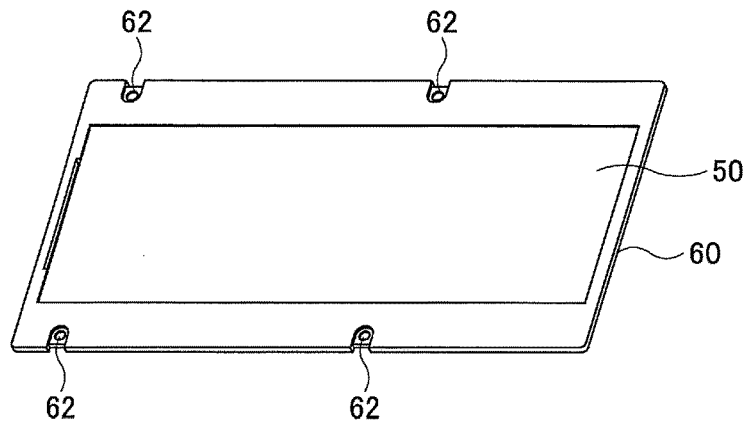

Next, as illustrated in FIGS. 2B through 2D, the ERM 110 is placed in the ERM placement region 61 formed on a first surface (an upper surface in FIGS. 2B through 2D) of the first board 60, and the first circuit board 50 is adhered to the first surface of the first board 60. To be more specific, double-sided adhesive tape is applied to the ERM placement region 61, and the ERM 110 is adhered to the double-sided adhesive tape applied to the ERM placement region 61. As a result, as illustrated in FIG. 2C, the ERM 110 is placed in the ERM placement region 61. Furthermore, double-sided adhesive tape is applied to a region on the first surface of the first board 60 for adhering the first circuit board 50, and a first surface (a lower surface in FIGS. 2B through 2D) of the first circuit board 50 is adhered to the double-sided adhesive tape applied to the region. As a result, as illustrated in FIG. 2D, the first circuit board 50 is adhered to the first surface of the first board 60. Grooves 62 are formed at four points in a peripheral part of the first surface of the first board 60. The first board 60 is thinner at the grooves 62 than in other parts of the first board 60.

Figure 2E:
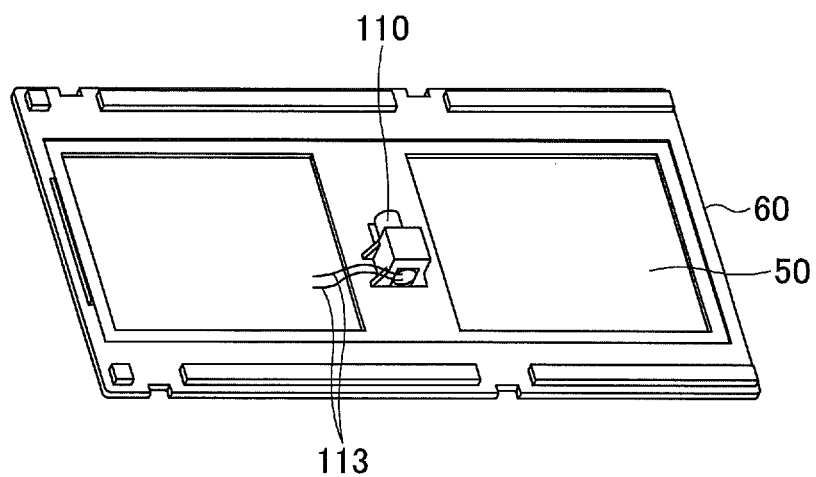

Next, as illustrated in FIG. 2E, wires 113 extending from the ERM 110 are connected to terminals formed on the first surface of the first circuit board 50 by, for example, soldering.

Figure 2F:
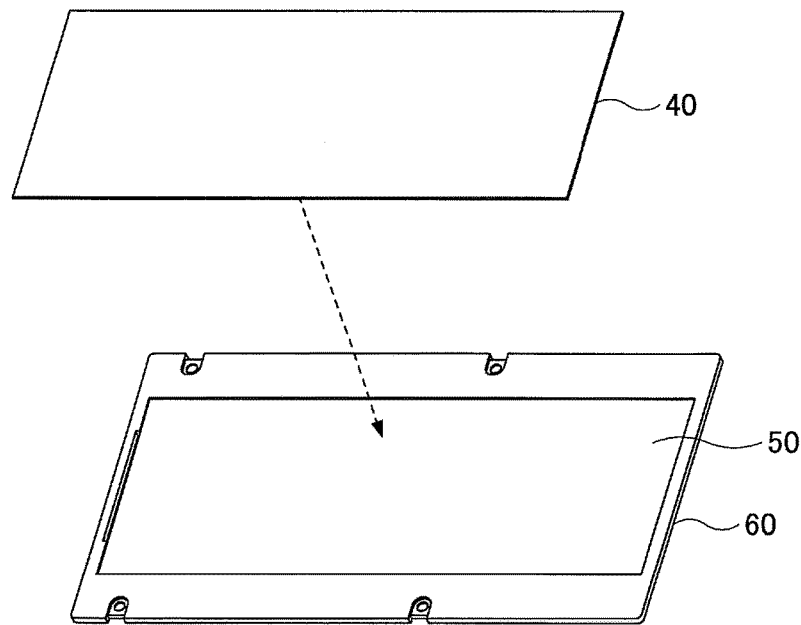
Figure 2G:
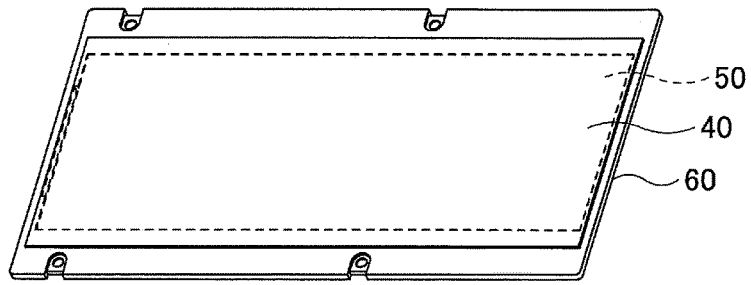

Next, as illustrated in FIGS. 2F and 2G, the light guide panel unit 40 is adhered to a second surface (an upper surface in FIGS. 2F and 2G) of the first circuit board 50 opposite to its first surface using, for example, double-sided adhesive tape. FIGS. 2F and 2G illustrate a state before and a state after adhering the light guide panel unit 40 to the first circuit board 50, respectively.

Figure 2H:
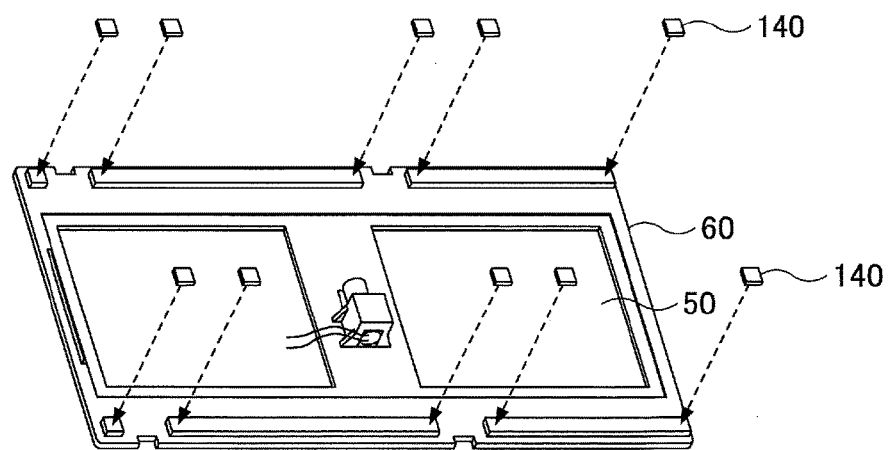
Figure 2I:
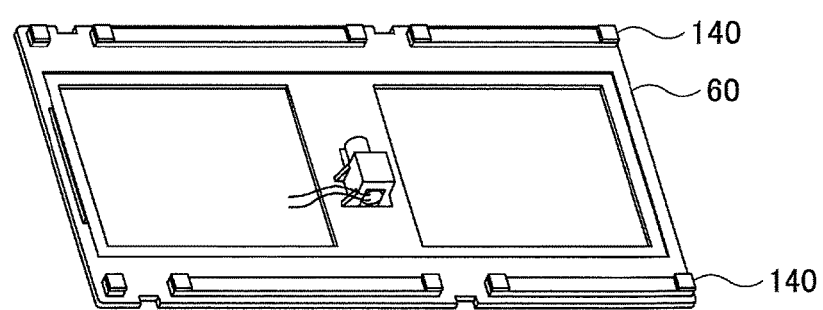

Next, as illustrated in FIGS. 2H and 2I, the cushions 140 are adhered to peripheries of a second surface of the first board 60 at ten points. The cushions 140 are formed of a resin material such as urethane foam. The cushions 140 are adhered to the second surface of the first board 60 using double-sided adhesive tape. FIGS. 2H and 2I illustrate a state before and a state after adhering the cushions 140 to the second surface of the first board 60, respectively.

Figure 2J:
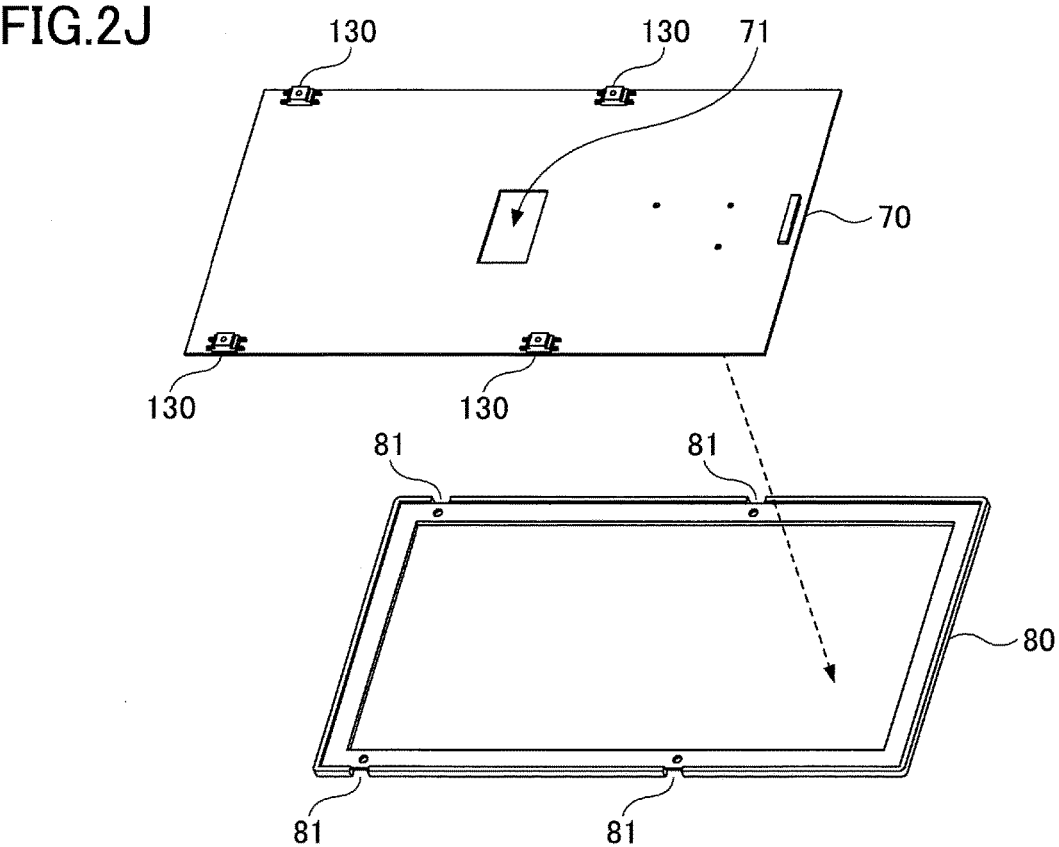
Figure 2K:
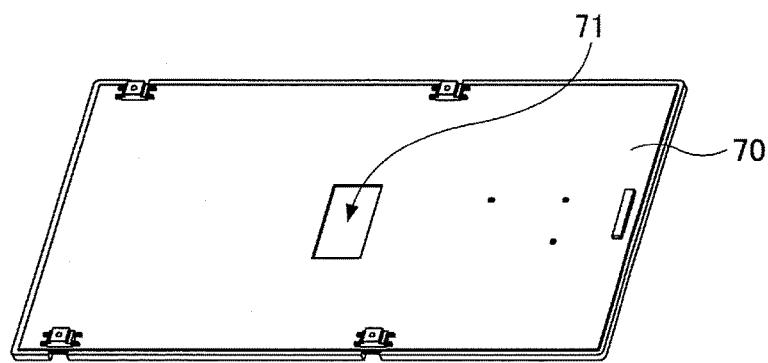

Next, as illustrated in FIGS. 2J and 2K, a first surface (a lower surface in FIGS. 2J and 2K) of the second circuit board 70 is adhered to a first surface (an upper surface in FIGS. 2J and 2K) of the second board 80 using, for example, double-sided adhesive tape. FIGS. 2J and 2K illustrate a state before and a state after adhering the second circuit board 70 to the second board 80. An opening 71 having a shape corresponding to the shape of the ERM 110 is formed at the center of the second circuit board 70. The load sensors 130 are placed at four points in peripheries of a second surface (an upper surface in FIGS. 2J and 2K) of the second circuit board 70 opposite to its first surface. Furthermore, grooves 81 are formed at four points in a peripheral part of a second surface (a lower surface in FIGS. 2J and 2K) of the second board 80 opposite to its first surface. The second board 80 is thinner at the grooves 81 than in other parts of the second board 80.

Figure 2L:
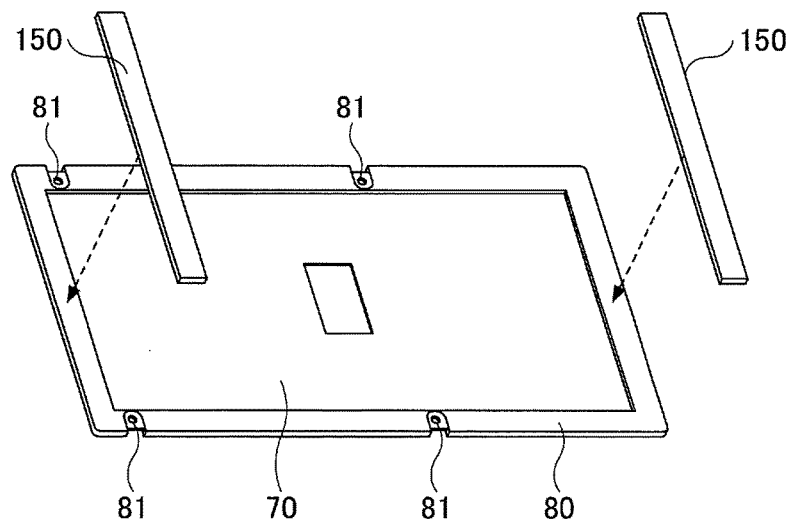
Figure 2M:
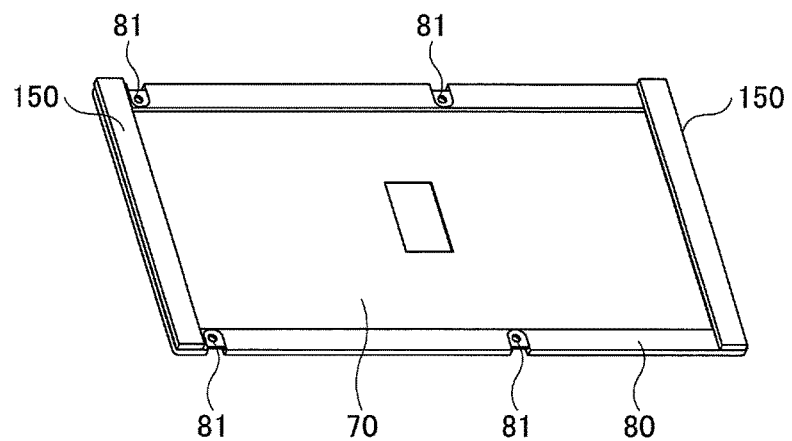

Next, as illustrated in FIGS. 2L and 2M, the suspensions 150 are adhered to both longitudinal ends of the second surface of the second board 80. The suspensions 150 are formed of a resin material such as urethane foam. The suspensions 150 are adhered to the second surface of the second board 80 using double-sided adhesive tape. FIGS. 2L and 2M illustrate a state before and a state after adhering the suspensions 150 to the second surface of the second board 80, respectively.

Figure 2N:
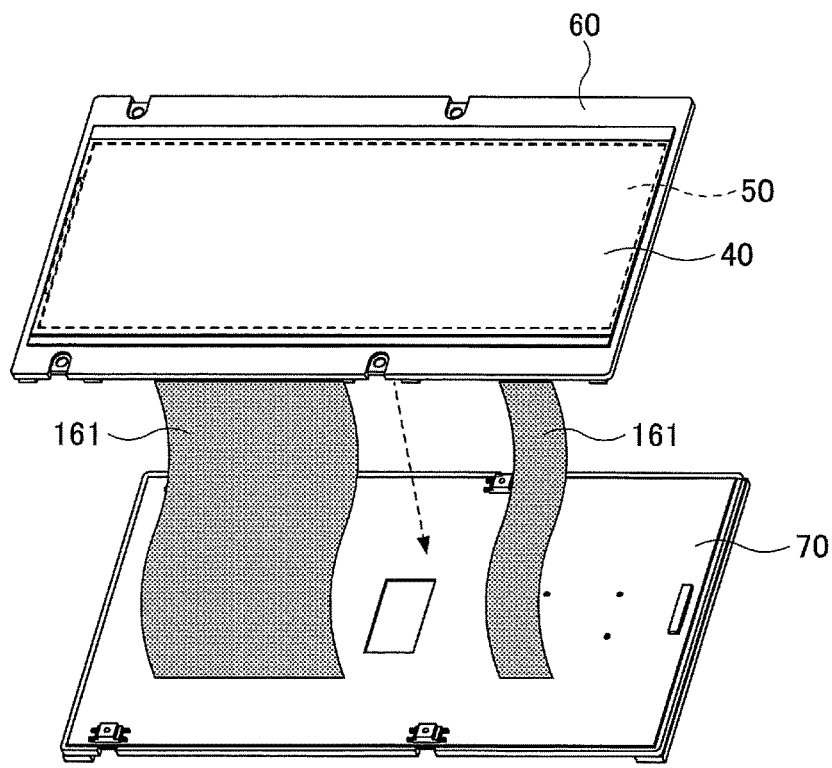
Figure 2O:
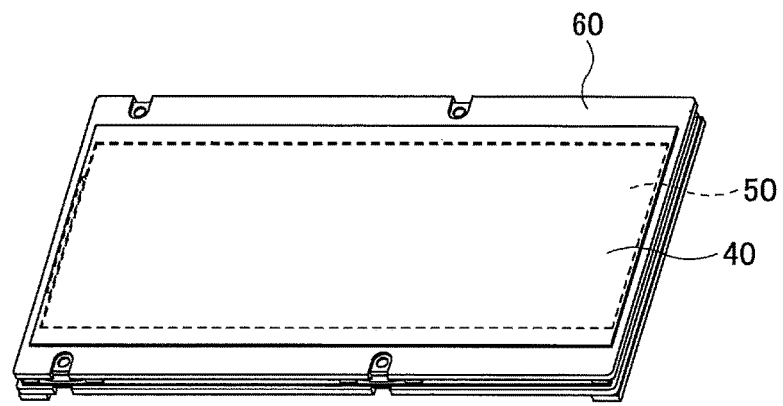

Next, as illustrated in FIG. 2N, electrode terminals on the first surface of the first circuit board 50 adhered to the first board 60 and electrode terminals on the second surface of the second circuit board 70 adhered to the second board 80 are connected by flexible printed circuits 161. Thereafter, as illustrated in FIG. 2O, the first board 60 to which the first circuit board 50 is adhered and the second board 80 to which the second circuit board 70 is adhered are stacked one over the other.

Figure 2P:
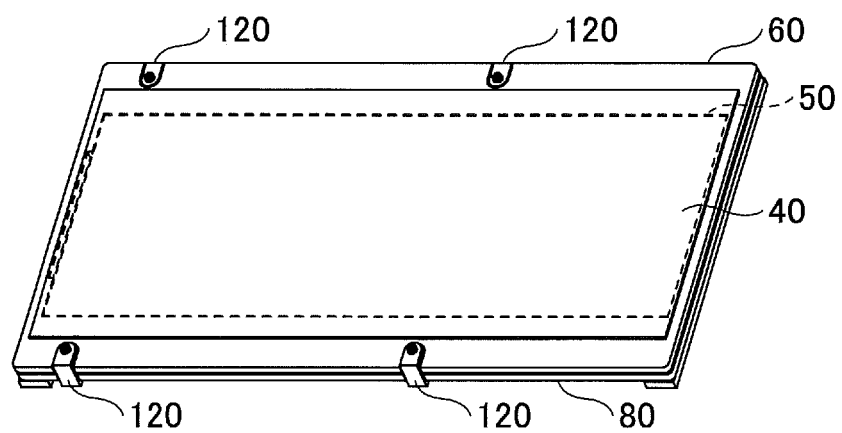
Figure 2Q:
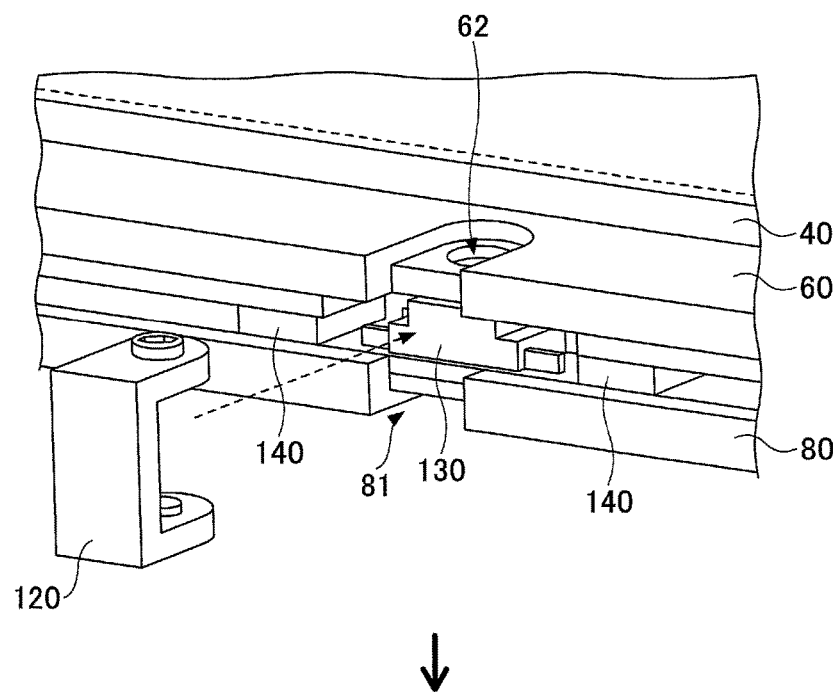
Figure 2R:
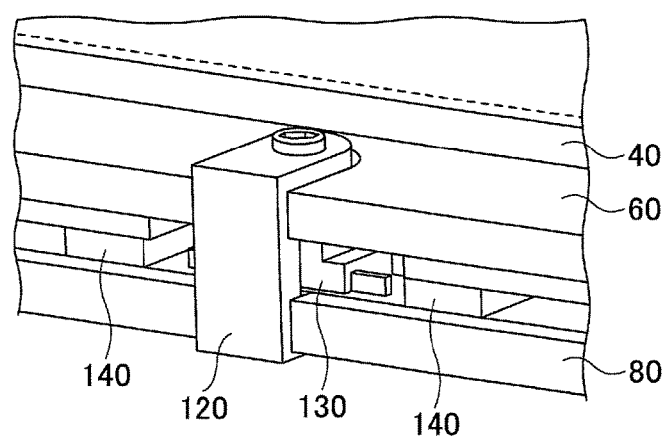

Next, as illustrated in FIGS. 2P through 2R, the first board 60 and the second board 80 are held together with the clips 120. As described above, the grooves 62 are formed in a peripheral part of the first surface of the first board 60, and the grooves 81 are formed in a peripheral part of the second surface of the second board 80. The grooves 62 in the first board 60 and the grooves 81 in the second board 80 are formed so as to be positioned above and below the load sensors 130, respectively. That is, the grooves 62 are formed on the first surface of the first board 60 at positions corresponding to the positions of the load sensors 130, and the grooves 81 are formed on the second surface of the second board 80 at positions corresponding to the positions of the load sensors 130. The load sensors 130 are held between parts of the first board 60 and parts of the second board 80 that are held by the clips 120. FIGS. 2Q and 2R illustrate a state before and a state after holding the first board 60 and the second board 80 together with the clips 120, respectively. FIG. 2R is an enlarged view of part of the structure of FIG. 2P.

Each load sensor 130 is formed of, for example, a piezoelectric material, and is capable of detecting a load that is an applied force without substantial deformation. The cushions 140 are provided one on each lateral side of each load sensor 130 as illustrated in FIGS. 2Q and 2R.

Figure 2S:
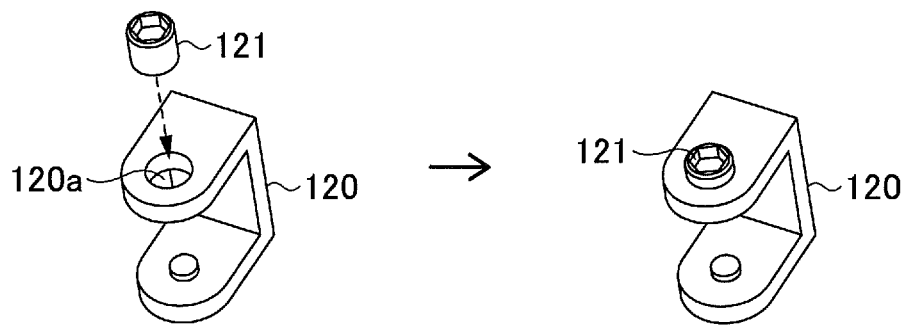

Referring to FIG. 2S, each clip 120 has an angular U-letter shape. A screw hole 120a for providing a thickness adjustment screw 121 is formed in one end part of the angular U-letter shape of each clip 120. The thickness adjustment screw 121 is inserted in the screw hole 120a. The thickness of the stacked first board 60 and second board 80 held together with the clips 120 is adjustable by the thickness adjustment screw 121 of each clip 120. That is, the first board 60 and the second board 80 are reliably fixed by making adjustments with the thickness adjustment screw 121 in accordance with the thickness of the stacked first board 60, load sensors 130, and second board 80 that are held together with the clips 120. FIG. 2S illustrates a state before and a state after inserting the thickness adjustment screw 121 in the screw hole 120a formed in each clip 120 on the left side and the right side, respectively.

That is, by tightening the thickness adjustment screw 121 of each clip 120, it is possible to ensure the fixation of the first board 60 and the second board 80. Furthermore, it is possible to adjust the height (thickness) of the first board 60 relative to the second board 80 by the degree of tightening of the thickness adjustment screw 121. A final adjustment of the height may be made while checking the outputs of the load sensors 130 after attachment of the chassis 90.

According to this embodiment, the grooves 62 formed on the first surface of the first board 60 and the grooves 81 formed on the second surface of the second board 80 are held together with the clips 120 each having an angular U-letter shape as illustrated in FIG. 2R. By thus forming the grooves 62 on the first surface of the first board 60 and the grooves 81 on the second surface of the second board 80, it is possible to prevent the first board 60 and the second board 80 from being displaced relative to each other.

Furthermore, according to this embodiment, the first board 60 and the second board 80 move together because the first board 60 and the second board 80 are held together with the clips 120. Therefore, the operation panel is prevented from deforming whether the operation panel is pressed with a strong or weak force.

Figure 2T:
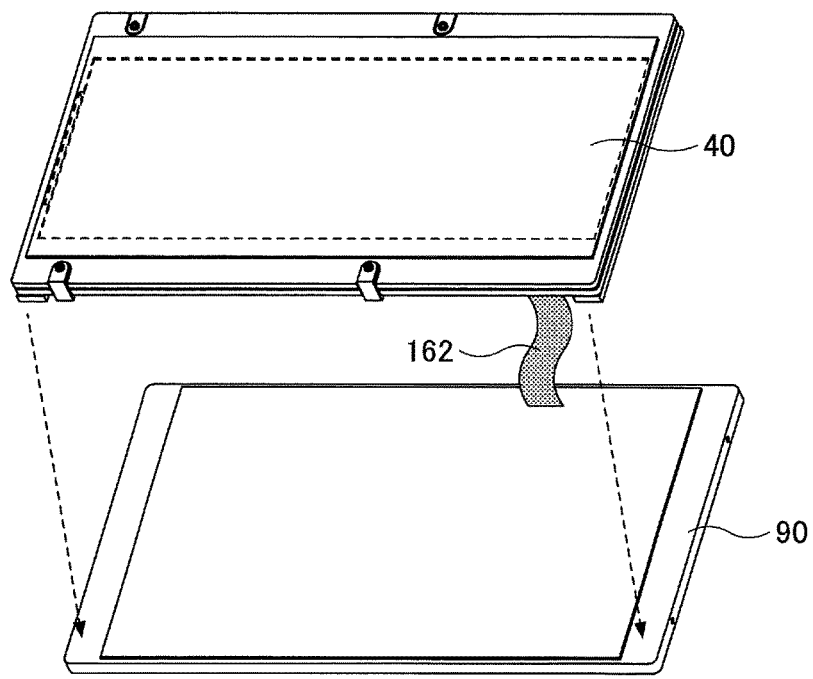
Figure 2U:
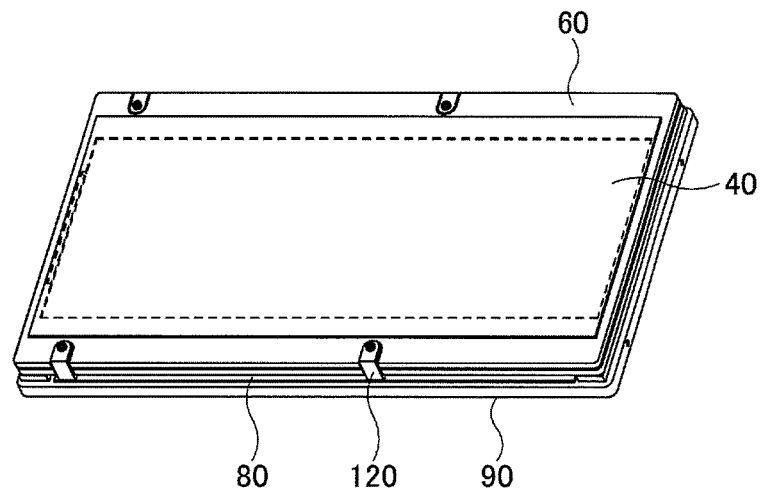

Next, as illustrated in FIG. 2T, the first board 60 and the second board 80 held together with the clips 120 illustrated in FIG. 2P and the chassis 90 are connected by a flexible printed circuit 162. Thereafter, as illustrated in FIG. 2U, the first board 60 and the second board 80 held together with the clips 120 are stacked on the chassis 90, and are fastened and fixed to the chassis 90 using screws.

Figure 2V:
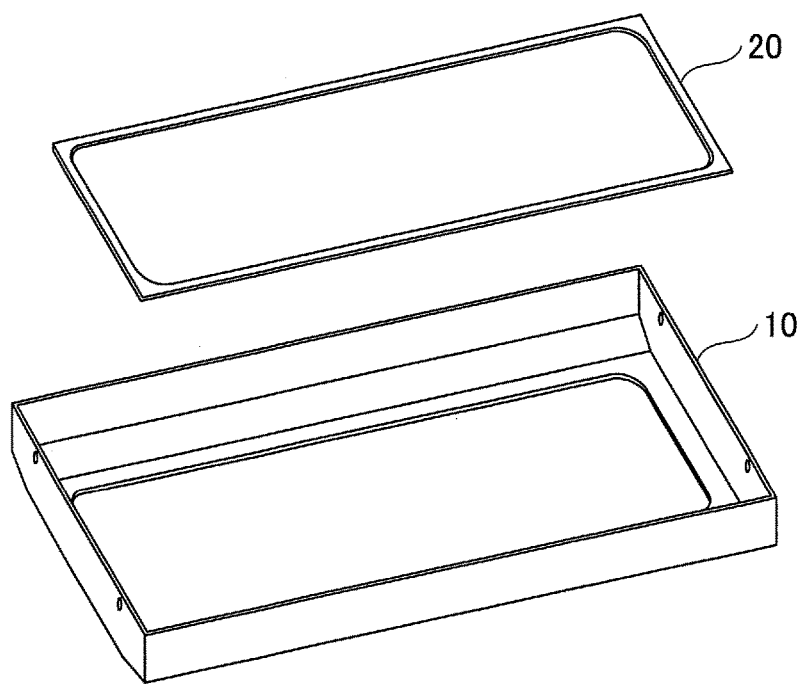
Figure 2W:
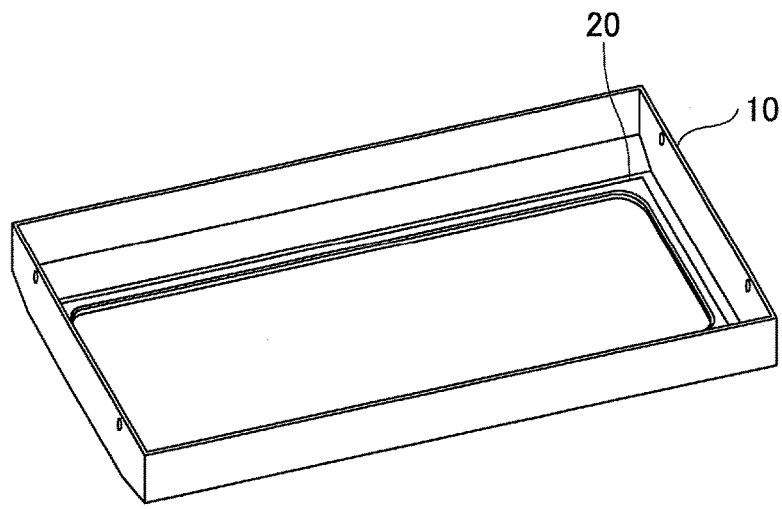

Next, as illustrated in FIGS. 2V and 2W, the dust-proof seal 20 is adhered to the inside of the housing 10 using, for example, double-sided adhesive tape. FIGS. 2V and 2W illustrate a state before and a state after adhering the dust-proof seal 20 to the inside of the housing 10, respectively.

Figure 2X:
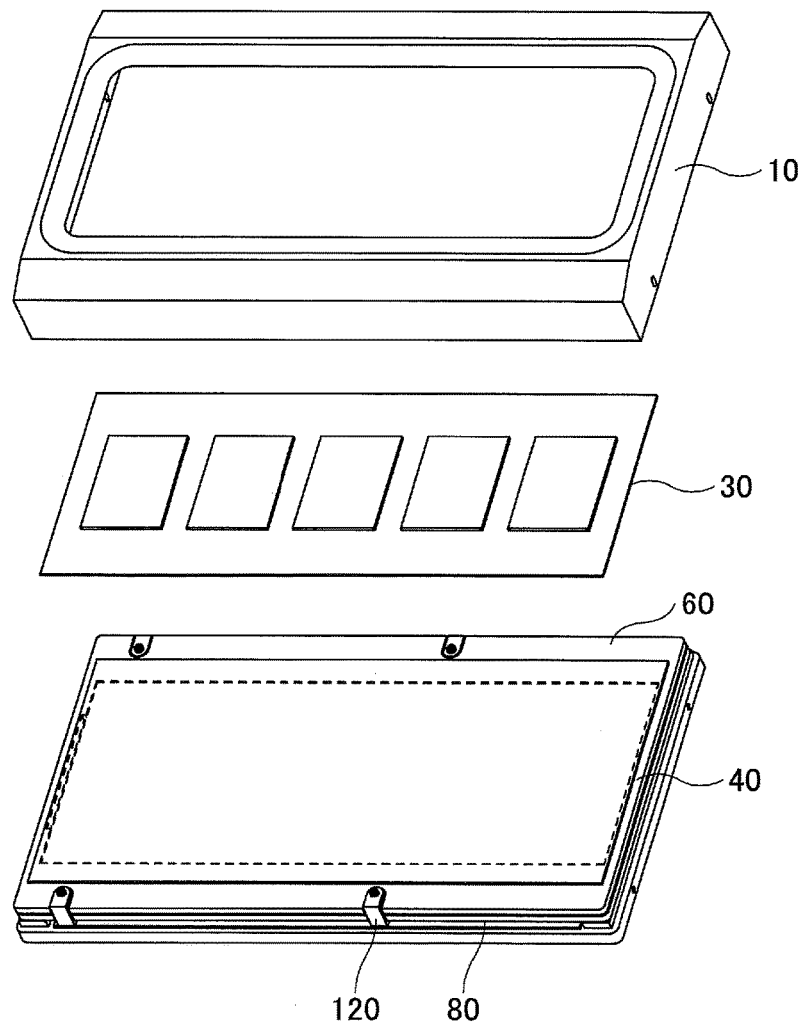
Figure 2Y:
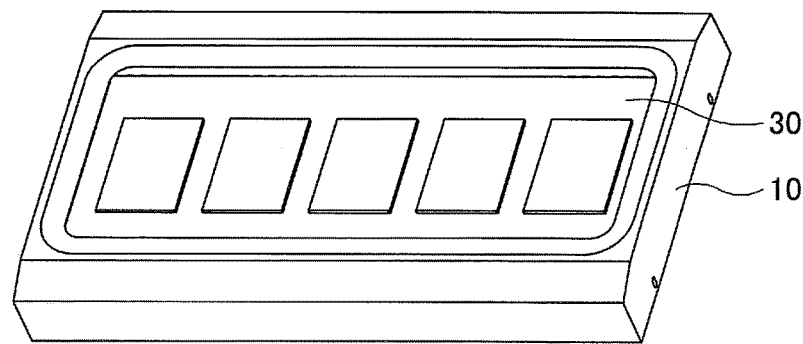

Next, as illustrated in FIGS. 2X and 2Y, the display panel 30 is placed on the first board 60 and the second board 80 held together with the clips 120 on the chassis 90, and the display panel 30, the first board 60 and the second board 80 held together with the clips 120, and the chassis 90 are further covered with the housing 10. FIGS. 2X and 2Y illustrate a state before and a state after covering the display panel 30, the first board 60 and the second board 80 held together with the clips 120, and the chassis 90 with the housing 10. Thereafter, the housing 10 and the chassis 90 are fixed using screws, so that the operation panel of this embodiment is manufactured.

Figure 3A:
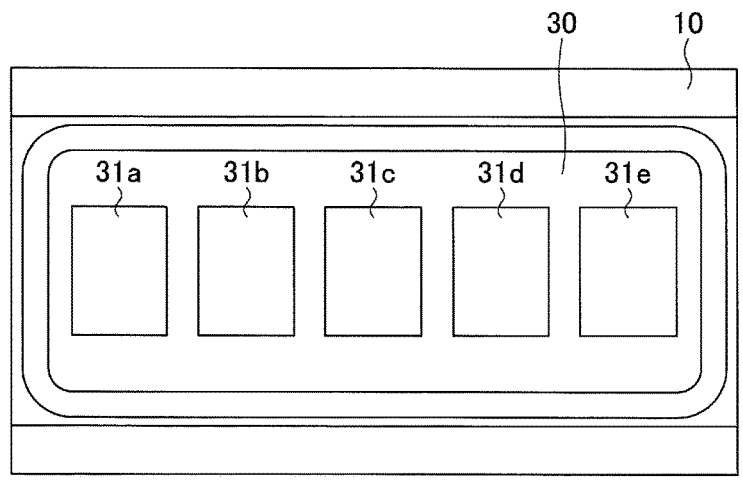
FIGS. 3A, 3B and 3C are diagrams illustrating an exterior of the operation panel according to the embodiment.
Figure 3B:
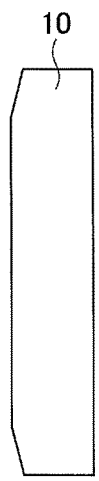
Figure 3C:
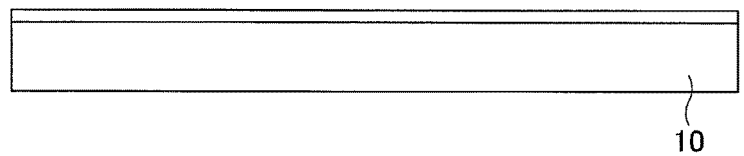
Figure 4:
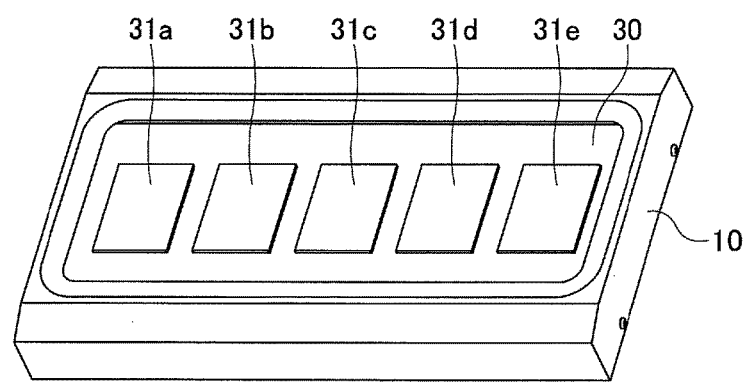
FIG. 4 is an external perspective view of the operation panel according to the embodiment.

FIGS. 3A, 3B, 3C and 4 illustrate the operation panel thus manufactured. FIGS. 3A, 3B and 3C are a plan view, a front view, and a right-side view, respectively, of the operation panel of this embodiment. FIG. 4 is a perspective view of the operation panel of this embodiment.

The operation panel of this embodiment may be operated by pressing one of operation regions 31a, 31b, 31c, 31d and 31e displayed on the display panel 30 with a finger or the like. For example, when the display panel 30 is a touch-screen, the pressing of the operation region 31a is detected in response to pressing the operation region 31a with a finger or the like. At this point, the magnitude of a pressing force with which the operation region 31a is pressed is detected with the load sensors 130 provided on the second circuit board 70.

According to this embodiment, by way of example, the ERM 110 is rotated to generate vibrations when the pressing force is greater than or equal to a predetermined magnitude. By this operation, an operator of the operation panel can determine whether the operator is operating the operation panel.

Furthermore, by controlling the operation panel to change the operation in accordance with the strength of a pressing force, and to change the pattern of vibrations generated by the ERM 110 in accordance with the change of the operation, it is possible to inform an operator of the operation panel of the contents of the operation through the operator's finger that is in contact with the display panel 30. In this case, the load sensors 130 may be configured to detect the magnitude of a pressing force at multiple levels, and the operation panel may be controlled so as to change the contents of the operation in accordance with the level of the magnitude of the force detected by the load sensors 130. Furthermore, the pattern of the vibrations may be changed in accordance with the magnitude of the detected force. As a result, it is possible for an operator to recognize the contents of the operation the user is performing by a difference in vibration pattern.

The same applies in the case when the other operation regions 31b, 31c, 31d and 31e displayed on the display panel 30 are operated. A different operation may be performed for each of the regions 31a through 31e.

Thus, the operation panel of this embodiment is operable without being depressed when pressed with a finger. Accordingly, it is possible for the operation panel of this embodiment to increase a high-grade image. Furthermore, it is possible to reduce the size of the operation panel as the thickness of the operation panel can be reduced.

The above-described embodiment may also be applied to an operation apparatus that includes one or more parts to be operated, where different operations are performable by changing a load applied by pressing with a finger or the like in a part to be operated.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. An operation panel and an operation apparatus have been described based on one or more embodiments of the present invention. It should be understood, however, that the various changes, substitutions, and alterations could be made hereto without departing from the spirit and scope of the present invention.

What is claimed is:

1. An operation panel, comprising:
    a first board in which a first groove is formed to extend from a first peripheral edge of the first board in a first direction away from the first peripheral edge;
    a second board in which a second groove is formed to extend from a second peripheral edge of the second board in a second direction away from the second peripheral edge;
    a load sensor provided between the first board and the second board at a position where the first groove and the second groove are formed, the load sensor being configured to detect magnitude of a force applied to the first board;
    a clip that includes a first portion and a second portion parallel to each other, the first portion and the second portion being inserted into the first groove and the second groove, respectively, in a direction parallel to the first and second directions, to clip the first board and the second board with the load sensor sandwiched between the first groove and the second groove, the clip having a through hole piercing through the first portion in a direction of a thickness of a stack of the first board, the load sensor, and the second board that are clipped with the clip; and
    a screw for adjusting a height of the first board relative to the second board, operably inserted through the through hole of the clip to adjust the thickness of the stack,
    wherein the load sensor overlaps the first portion of the clip, the first groove, the second groove, and the second portion of the clip when viewed in a direction in which the first board, the load sensor, and the second board are stacked.

2. The operation panel as claimed in claim 1, further comprising:
    a vibration generating element provided on one of the first board and the second board and covered with a circuit board adhered to the one of the first board and the second board, the vibration generating element being configured to vibrate in response to the magnitude of the force detected by the load sensor.

3. The operation panel as claimed in claim 2,
wherein the load sensor is configured to detect the magnitude of the force applied to the first board at multiple levels, and
wherein the vibration generating element is configured to vibrate in different patterns in accordance with the magnitude of the force detected by the load sensor.

4. The operation panel as claimed in claim 1, further comprising:
a display configured to display a region to be operated.

5. The operation panel as claimed in claim 1, wherein the load sensor is provided between a part of the first board and a part of the second board that are clipped with the clip.

6. The operation panel as claimed in claim 1, wherein the load sensor is positioned immediately below the first groove and immediately above the second groove in the direction of the thickness of the stack.

7. An operation panel, comprising:
a first board having a first surface in which a first groove is formed to extend from a first peripheral edge of the first board in a first direction parallel to the first surface;
a second board having a second surface in which a second groove is formed to extend from a second peripheral edge of the second board in a second direction parallel to the second surface, the second surface facing away from the first surface;
a load sensor provided between the first board and the second board at a position where the first groove and the second groove are formed, the load sensor being configured to detect magnitude of a force applied to the first board;
a clip that includes a first portion and a second portion parallel to each other, the first portion and the second portion being inserted into the first groove and the second groove, respectively, in a direction parallel to the first and second directions, to clip the first board and the second board with the load sensor sandwiched between the first groove and the second groove, the clip having a through hole piercing through the first portion in a direction of a thickness of a stack of the first board, the load sensor, and the second board that are clipped with the clip; and a screw for adjusting a height of the first board relative to the second board, operably inserted through the through hole of the clip to adjust the thickness of the stack,
wherein the load sensor overlaps the first portion of the clip, the first groove, the second groove, and the second portion of the clip when viewed in a direction perpendicular to the first surface of the first board.

8. The operation panel as claimed in claim 7, wherein the load sensor is positioned immediately below the first groove and immediately above the second groove in the direction perpendicular to the first surface of the first board.

9. An operation panel, comprising:
a first board in which a first groove is formed to extend from a first peripheral edge of the first board in a first direction away from the first peripheral edge;
a second board in which a second groove is formed to extend from a second peripheral edge of the second board in a second direction away from the second peripheral edge;
a circuit board interposed between the first board and the second board;
a load sensor provided on the circuit board to be positioned between the first groove of the first board and the second groove of the second board, the load sensor being configured to detect magnitude of a force applied to the first board;
a clip that includes a first portion and a second portion parallel to each other, the first portion and the second portion being inserted into the first groove and the second groove, respectively, in a direction parallel to the first and second directions, to clip the first board and the second board with the load sensor sandwiched between the first groove and the second groove, the clip having a through hole piercing through the first portion in a direction of a thickness of a stack of the first board, the load sensor, and the second board that are clipped with the clip; and
a screw for adjusting a height of the first board relative to the second board, operably inserted through the through hole of the clip to adjust the thickness of the stack,
wherein the load sensor is aligned with the first portion of the clip, the first groove, the second groove, and the second portion of the clip in the direction of the thickness of the stack.

* * * * *